United States Patent
Kühl

(10) Patent No.: US 6,189,194 B1
(45) Date of Patent: Feb. 20, 2001

(54) METHOD FOR JOINING AND INSPECTING

(75) Inventor: Hans Kühl, Plochingen (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/202,715

(22) PCT Filed: May 28, 1997

(86) PCT No.: PCT/EP97/02755

§ 371 Date: Sep. 13, 1999

§ 102(e) Date: Sep. 13, 1999

(87) PCT Pub. No.: WO97/49512

PCT Pub. Date: Dec. 31, 1997

(30) Foreign Application Priority Data

Jun. 26, 1996 (DE) ............................................. 196 25 554

(51) Int. Cl.[7] .................................................. B23P 17/00
(52) U.S. Cl. .............................. 29/421.1; 29/507; 29/523
(58) Field of Search ........................... 29/888.08, 888.1, 29/6.01, 407.08, 523, 507, 421.1; 403/282, 280, 298

(56) References Cited

U.S. PATENT DOCUMENTS

| | | |
|---|---|---|
| 4,575,913 | 3/1986 | Sugiuchi et al. . |
| 4,597,365 * | 7/1986 | Madaffer ................................ 29/523 |
| 4,774,852 * | 10/1988 | Matt ........................................ 74/567 |
| 4,835,832 * | 6/1989 | Arnold et al. ......................... 29/523 |
| 4,922,785 * | 5/1990 | Arnold et al. ......................... 29/523 |
| 4,947,547 * | 8/1990 | Matt ..................................... 29/888.1 |
| 5,272,930 * | 12/1993 | Nakamura et al. .................. 29/888.1 |
| 5,307,708 * | 5/1994 | Matt ..................................... 29/888.1 |
| 5,419,217 * | 5/1995 | Umezawa et al. ................... 29/888.1 |
| 5,437,097 * | 8/1995 | Yanagawa ............................ 29/888.1 |

FOREIGN PATENT DOCUMENTS

| | | |
|---|---|---|
| 3302762 | 2/1984 | (DE) . |
| 0592068 | 4/1994 | (EP) . |
| 2121908 * | 1/1984 | (GB) ................................... 29/888.1 |
| 96/19685 | 6/1996 | (WO) . |

* cited by examiner

Primary Examiner—S. Thomas Hughes
Assistant Examiner—Jermie E. Cozart
(74) Attorney, Agent, or Firm—Evenson, McKeown, Edwards & Lenahan, P.L.L.C.

(57) ABSTRACT

A process for fastening at least one part, such as a cam, gear wheel, disc, etc., onto a shaft in a torsionally resistant manner. The process includes a combination of features, including threading the part with a mating play onto the shaft, the part seating on the shaft with a seating surface which has a profile of a plurality of curved spline surfaces which are preferably offset by the same angles around the circumference and gradually rise up inwards over a cylindrical reference surface and fall back down again onto the reference surface. The process also includes the feature of eliminating the mating play between the shaft and the part and the feature of turning the part relative to the shaft into an intended position for fastening after eliminating the mating play. The torque required for turning the part into an intended angular position can be measured and can serve as a check to determine if a desired frictional engagement has been achieved.

9 Claims, 1 Drawing Sheet

METHOD FOR JOINING AND INSPECTING

BACKGROUND AND SUMMARY OF THE INVENTION

This invention relates to a process for the torsionally resistant connection of a shaft to at least one part arranged on the shaft. In this process, the part is threaded with mating play onto the shaft and is fastened in a specific position on the latter by eliminating the mating play. The invention also relates to an assembly thus joined and to a camshaft thus joined.

It is known to fasten cams, for example, on shafts by shrink-fitting or by expanding the tubular shaft. For shrink-fitting (DE 33 01 749 A), a heated cam can be pushed onto the shaft and shrunk securely on the shaft by contracting during cooling. A tubular shaft can be expanded by applying appropriately high internal pressure to achieve frictionally engaging contact with the bores of cams arranged on the shaft (DE 38 03 687 A).

It has also already been proposed (DE 36 38 310 A) to use a shaft of a cross-sectionally unround outer contour, onto which the cams of correspondingly unround inner contours are fastened. The fastening of the cams on the polygonal shaft is intended to take place by interlocking actions of the polygon shape to be brought about by expanding the polygon faces or by compressing the polygon shoulders when pushing on the cams and the subsequent springing back of the polygonal tube.

Furthermore, it has already been proposed (DE 25 46 802 C) to provide the seating of the cams with an unround design and to deForm the wall of the tubular shaft into the unround seatings of the cams by generating high pressure in the space inside the shaft.

It has been found, however, that the frictional engagement which is required for the transmission of the forces occurring during operation of the shaft is not always achieved with the required reliability. Expansion of a tubular shaft by internal pressure requires considerable time to build up the very high pressure necessary, with the result that the cycle time for this method of production, and consequently its costs, are high.

It was therefore the object of the invention to provide a simple and inexpensive possible way of fastening parts such as cams, discs, gear wheels and the like securely on shafts, i.e. secured against torsion when maximum envisaged torques are applied. It achieves this object by the features stated in the characterizing clause of the main claim.

The unround profile, at least of the part to be fastened on the shaft, has the effect that the elimination of the mating play achieves virtually a keyed connection between the part and the shaft to the extent that the two parts oppose torsion with respect to each other with increasing resistance, the achieved final torque of which exceeds a torque to be transferred by the parts. The fact that the part is turned into the intended angular position after fastening on the shaft has the effect of increasing the frictional engagement to the value required for the torque to be transferred. A precondition for this is, of course, that the turning of the part to be fastened takes place in that direction in which the splines slide on one another. This turning into the intended position advantageously also takes place in that direction in which the part normally has to transfer torque during operation or—if transferring torques in both directions of rotation—the higher of two torques of different magnitudes.

The fact that the force required for turning a cam into the intended angular position on the shaft is measured additionally offers the possibility of testing, by comparison of the measured force with a setpoint value, whether the intended secure seating has been achieved. Since the turning into the intended angular position takes place at all the cams, the testing for achieving the desired secure seating is carried out at all the cams, thus the testing is not only 100% but is also non-destructive.

The effect according to the invention is already achieved if only the cam has the spline-surface profile. During shrink-fitting of the cam onto the shaft or during expansion of the shaft into the bore of the cam, the shaft is pressed into the profile shape of the cam. The keyed connection is particularly effective, however, if both the cam and the shaft have a matching spline-surface profile.

The cam can be shrink-fitted onto the shaft. Particularly advantageous, however, is a process in which the shaft is of a hollow design and is expanded into the bore of the cam. This expansion may take place by means of the known high-pressure internal expansion by means of pressure medium or by moving an expansion drift through the shaft.

Particularly effective fixing of the cam on the shaft takes place in this case if the expansion drift also has an adapted spline profile and is moved, preferably pulled, through the shaft in an angularly appropriate position, that is to say in a position in which it presses with its splines the splines of the shaft into the valleys between the splines of the cam.

BRIEF DESCRIPTION OF THE DRAWINGS

The invention is illustrated in the figures of the drawing by the example of a camshaft. It can be used, however, when fastening any desired parts, such as for example gear wheels, belt pulleys, crank arms etc., on shafts. In the drawings.

DESCRIPTION OF THE DRAWINGS

Figure 1:
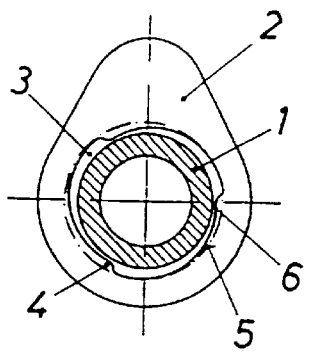
FIG. 1 shows a joined shaft and cam in cross section through the shaft.

FIG. 1 shows a smooth, hollow shaft 1 without profiling on the outer surface. By contrast, a cam 2, threaded onto the shaft 1, has circular-spline profiling in its bore 3.

This circular-spline profiling comprises splines 4 which rise up over an imaginary, cylindrical reference surface 5 and fall steeply back down onto it. The three splines 4 represented are offset with respect to one another around the circumference by 120° in each case. Between the shaft 1 and the threaded-on cam 2 there is a mating gap 6.

The slope of the splines 4, which is shown greatly exaggerated here for the sake of clarity, is between 1:50 and 1:200, preferably about 1:100.

Figure 2:
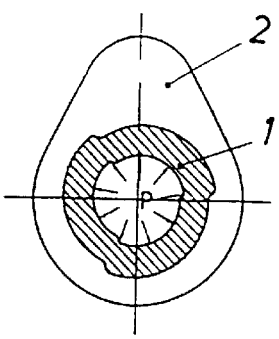
FIG. 2 shows the expanding of the shaft by means of internal high-pressure deformation.

For fastening the cam 2 on the shaft 1, in the embodiment of FIG. 2, a fluid under very high pressure is admitted to the inside of the hollow shaft—this internal high-pressure deformation process is known and is therefore not described in any more detail here. This high pressure causes the shaft 1 to be expanded, while undergoing permanent deformation, flowing into the valleys between the splines 4 in the cam 2.

Figure 3:
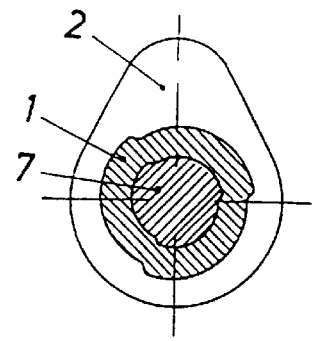
FIG. 3 shows the expanding of the shaft by means of a drift.

In the embodiment of FIG. 3, for fastening the cam 2, a drift 7 is pulled through the shaft 1, by which the shaft is likewise expanded while undergoing permanent deformation. The drift may have a circular circumferential surface. However, it advantageously has likewise the circular-spline profiling of the cam 2 and is pulled through the shaft in an angular position in which the splines provided on it are opposite the valleys between the splines 4 in the cam 2. As a result, the material of the shaft 1 displaced by the drift 7 is pressed specifically into the valleys between the splines 4 of the cam 2.

Figure 4:
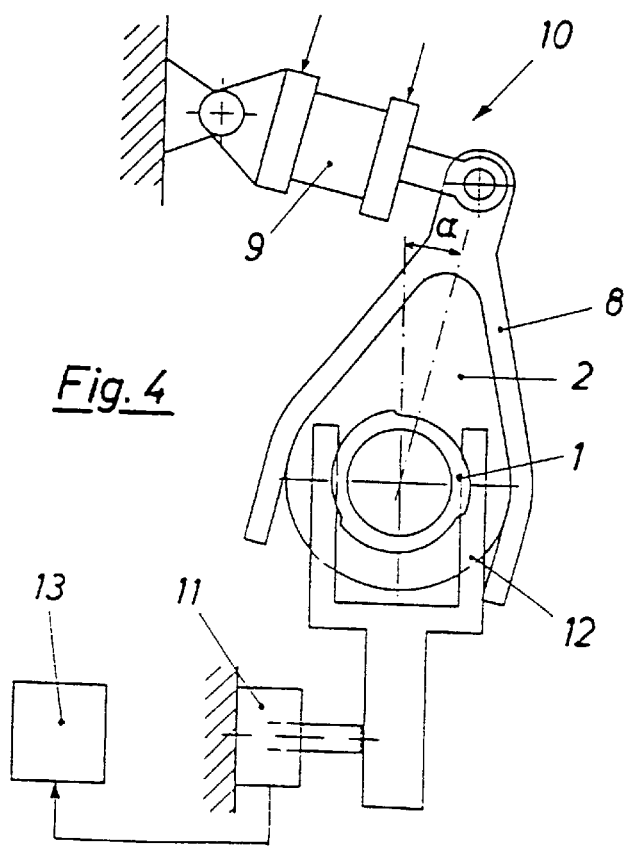
FIG. 4 shows the turning of the cam into the intended position.

According to FIG. 4, a cam 2 fastened in this way on the shaft 1 is turned through the pivoting angle alpha into the intended angular position on the shaft by means of a pivoting device 10, which seizes the cam and is indicated only very schematically and which has a cam gripper 8 and a fluidic operating element 9. During this operation, the backs of the splines 4 of the cam 2 and of the splines formed on the shaft 1 slide on one another. This increases the surface pressure between these backs until there is deformation of the parts and a strong increase in the frictional engagement between the parts.

According to the invention, the force required for turning the cam 2 into position on the shaft 1 is sensed by means of a measuring device 11 in the form of a load cell, for example, which is acted upon by a pivotally mounted counter-holding device 12 for the shaft 1, and is compared in a comparison device 13 with a predetermined setpoint value. Only if this setpoint value of the force for pivoting the cam is at least reached does the part produced meet the requirements. It goes without saying that the result of the value comparison in the comparison device 13 is displayed.

The turning of the cams 2 into the intended angular position could take place simultaneously at all the cams. However, then the measuring device 11 would sense the force required for turning all the cams together and inadequate fastening of one of the cams could remain unnoticed. It is therefore preferred to perform the turning of the cams 2 and the sensing of the torque respectively occurring thereby separately at each cam.

On parts which do not have to have any specific angular position with respect to the shaft 1, such as gear wheels or discs for example, a turning and consequent increasing of the frictional engagement may be performed until an intended holding torque is reached. The reaching of this holding torque may be sensed by the measuring device 11 and the comparison device 13, which can then control the pivoting device 10 correspondingly.

As a modification of the method presented, instead of the smooth shaft 1, a shaft which has on its outer surface likewise a profiling made to match the circular-spline profiling of the cam 2 may also be used. When expanding this shaft, then only the necessary mating play between the parts is eliminated; there is no need for deforming the shaft into the valleys between the splines 4 in the bore 3 of the cam.

The number of splines 4 of the circular-spline profiling depends on the intended use of the assembly. If a high centering accuracy is important here, then three cams arranged at equal intervals with respect to one another are advantageously provided. On the other hand, the expedient number of splines in the case of a camshaft for an internal combustion engine, for example, is advantageously based on the number of cylinders of the engine for which the camshaft is intended. For instance, cams intended for a four-cylinder engine preferably have four splines, cams intended for a six-cylinder engine preferably have six splines.

What is claimed is:

1. Process for torsionally resistant connection of a shaft to at least one part arranged on the shaft, in which process the part is placed with a mating play onto the shaft, to be fastened in a specific position on the shaft by eliminating the mating play, comprising:

seating the part on the shaft with a seating surface of the part which has a profile of a plurality of curved spline surfaces which are offset by the same angles around a circumference of the seating surface, gradually rise up inwards over a cylindrical reference surface and fall back down again onto the reference surface, eliminating the mating play between the shaft and the part, and turning the part relative to the shaft into an intended position after eliminating the mating play.

2. Process according to claim 1, and further comprising measuring the force required for turning the part into the intended position.

3. Process according to claim 2, and further comprising comparing the measured value of the force for turning the part into the intended position with a setpoint value.

4. Process according to claim 1, wherein both the part, on its seating surface, and the shaft have matching profiles.

5. Process according to claim 1, wherein eliminating the mating play includes shrink-fitting the part onto the shaft.

6. Process according to claim 1, wherein eliminating the mating play includes expanding a hollow shaft.

7. Process according to claim 6, wherein the expansion of the shaft takes place by applying very high fluidic pressure inside of the shaft.

8. Process according to claim 6, wherein the expansion of the shaft takes place by moving through it a drift of an outer diameter exceeding an inner diameter of the shaft.

9. Process according to claim 8, wherein the drift has a profile adapted to correspond to the seating profile of the part on the shaft and is moved through the hollow shaft in an angularly appropriate manner.

* * * * *